US008145941B2

(12) United States Patent
Jacobson

(10) Patent No.: US 8,145,941 B2
(45) Date of Patent: Mar. 27, 2012

(54) DETECTION AND CORRECTION OF BLOCK-LEVEL DATA CORRUPTION IN FAULT-TOLERANT DATA-STORAGE SYSTEMS

(75) Inventor: Michael B. Jacobson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1428 days.

(21) Appl. No.: 11/590,958

(22) Filed: Oct. 31, 2006

(65) Prior Publication Data

US 2008/0115017 A1 May 15, 2008

(51) Int. Cl.
*G06F 11/00* (2006.01)
(52) U.S. Cl. .................. 714/6.24; 714/764; 714/770
(58) Field of Classification Search .............. 714/6, 770, 714/52, 54, 6.24, 763, 764
See application file for complete search history.

(56) References Cited

U.S. PATENT DOCUMENTS

| | | | | |
|---|---|---|---|---|
| 7,376,863 | B2 * | 5/2008 | Benhase et al. | 714/6 |
| 7,627,715 | B1 * | 12/2009 | Corbett | 711/114 |
| 2005/0050384 | A1 * | 3/2005 | Horn | 714/6 |
| 2006/0031712 | A1 * | 2/2006 | Subbarao et al. | 714/6 |
| 2006/0047993 | A1 | 3/2006 | Benhase et al. | |
| 2006/0123321 | A1 * | 6/2006 | Deenadhayalan et al. | 714/763 |
| 2006/0179345 | A1 * | 8/2006 | Subbarao | 714/6 |
| 2009/0313499 | A1 * | 12/2009 | Deenadhayalan et al. | 714/6 |

FOREIGN PATENT DOCUMENTS

| | | |
|---|---|---|
| JP | 60-186926 | 9/1985 |
| JP | 7-044322 | 2/1995 |
| JP | 09-305328 | 11/1997 |
| JP | 9-305328 | 11/1997 |
| JP | 11-102576 | 4/1999 |
| JP | 2001-216743 | 8/2001 |
| JP | 2005-209227 | 8/2005 |
| JP | 2006-520036 | 8/2006 |
| JP | 2006-268873 | 10/2006 |
| JP | 2008-525898 | 7/2008 |
| JP | 2008-526164 | 7/2008 |
| WO | WO 2006/071837 | 7/2006 |
| WO | WO 2006/073322 | 7/2006 |

OTHER PUBLICATIONS

JP Office Actiion, English Translation, dated May 10, 2010, 3 pages.
JP Office Action, not translated, dated Jan. 5, 2011, 3 pages.

* cited by examiner

*Primary Examiner* — Yolanda L Wilson

(57) ABSTRACT

Various embodiments of the present invention provide fault-tolerant, redundancy-based data-storage systems that rely on disk-controller-implemented error detection and error correction, at the disk-block level, and RAID-controller-implemented data-redundancy methods, at the disk and disk-stripe level, in order to provide comprehensive, efficient, and system-wide error detection and error correction. Embodiments of the present invention use disk-level and stripe-level data redundancy to provide error detection and error correction for stored data objects, obviating the need for certain costly, intermediate levels of error detection and error correction commonly employed in currently available fault-tolerant, redundancy-based data-storage systems.

14 Claims, 9 Drawing Sheets

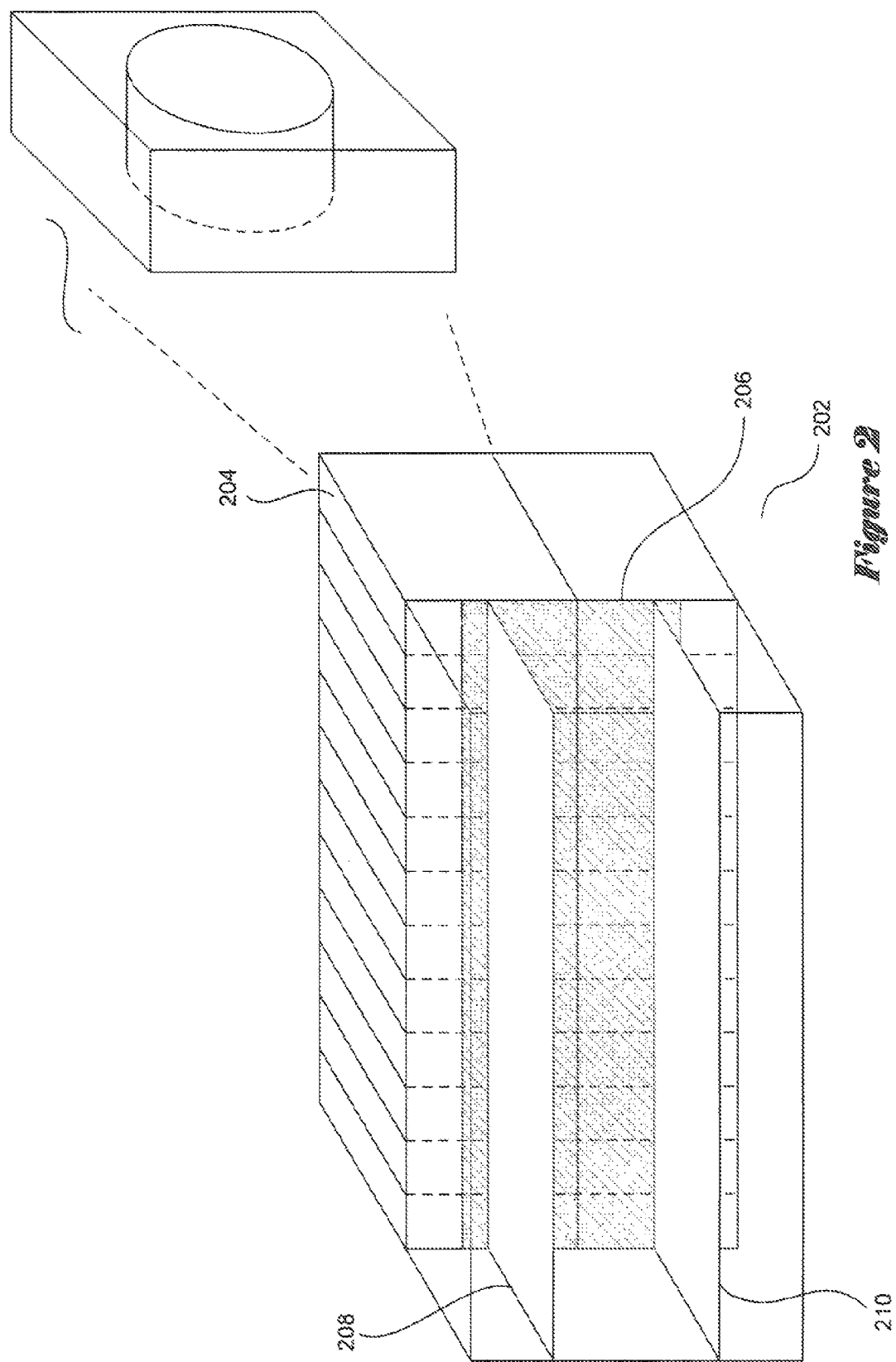

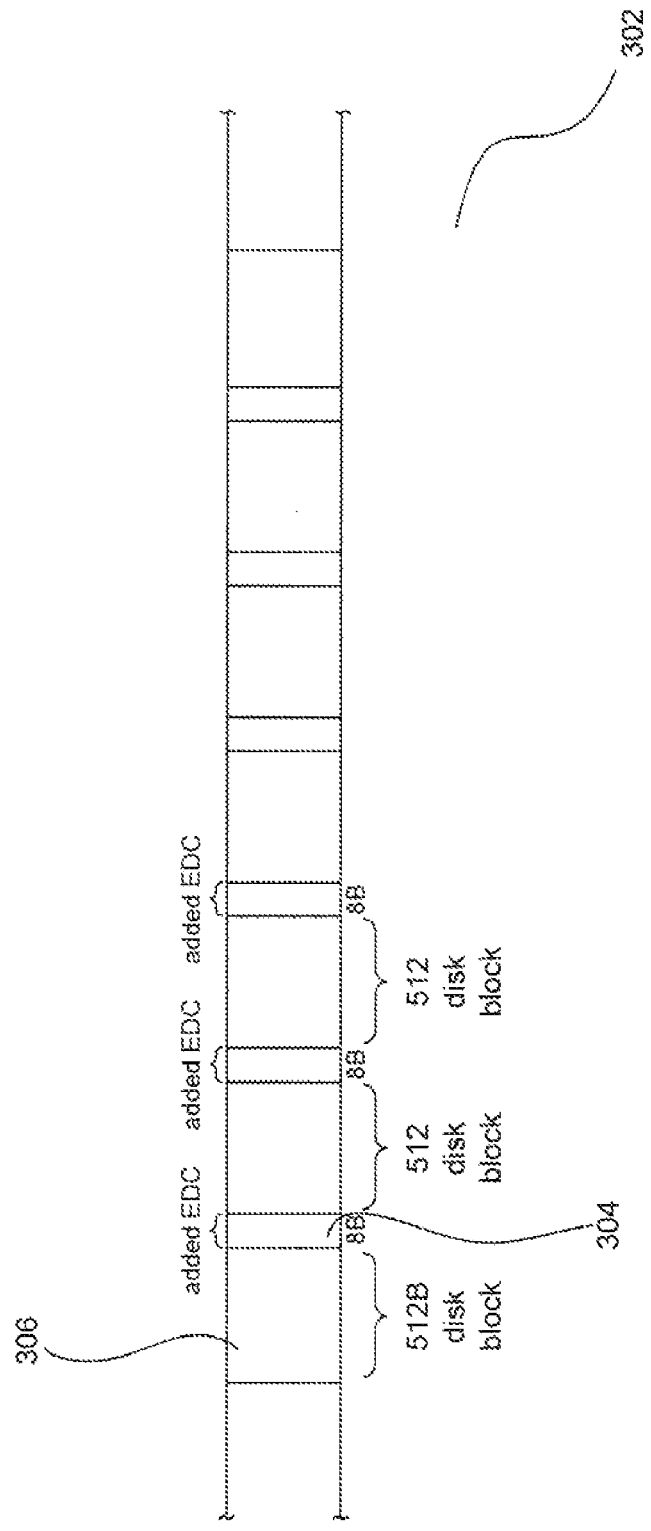

DETECTION AND CORRECTION OF BLOCK-LEVEL DATA CORRUPTION IN FAULT-TOLERANT DATA-STORAGE SYSTEMS

TECHNICAL FIELD

The present invention is related to data storage, error detection and error correction, redundant arrays of independent disks ("RAIDs"), and, in particular, to a method for using data redundancy for block-level data-corruption surveillance and correction within a RAID.

BACKGROUND OF THE INVENTION

Enormous progress has been made, in the past 50 years, in reliable and robust storage of data in electronic mass-storage devices. Information theory, developed in the 1940's, led to development of mathematical techniques for error detection and error correction, providing methods for inserting additional information within transmitted or stored information that allows for certain classes of errors in the transmitted or stored information to be detected and corrected. In addition, progress in integrated circuits, mass-storage devices, and basic computer science and electronics has led to the development of redundancy-based, fault-tolerant mass-storage systems, including redundant arrays of independent disks ("RAIDs"). In RAID systems, data is stored redundantly. In many RAID systems, the redundant information is generated by error-correcting-code methods. When one or more disks, depending on the type of RAID system, fail, contents of the one or more failed disks can be regenerated from the redundant data stored within the RAID system.

Additional levels of error detection and error correction are implemented within complex data-storage systems, such as RAIDs. While the many layers of overlapping error-detection and error-correction methods serve to create highly robust and fault-tolerant data-storage systems, the many layers of error detection and error-correction within redundancy-based data-storage systems are also associated with computational and data-storage-capacity costs. For these reasons, designers, manufacturers, and, ultimately, users of redundancy-based, fault-tolerant data-storage systems continue to seek more efficient and economical techniques for achieving high levels of fault tolerance in data-storage systems with minimal computational overheads and minimally decreased data-storage capacities.

SUMMARY OF THE INVENTION

Various embodiments of the present invention provide fault-tolerant, redundancy-based data-storage systems that rely on disk-controller-implemented error detection and error correction, at the disk-block level, and RAID-controller-implemented data-redundancy methods, at the disk and disk-stripe level, in order to provide comprehensive, efficient, and system-wide error detection and error correction. Embodiments of the present invention use disk-level and stripe-level data redundancy to provide error detection and error correction for stored data objects, obviating the need for certain costly, intermediate levels of error detection and error correction commonly employed in currently available fault-tolerant, redundancy-based data-storage systems.

BRIEF DESCRIPTION OF THE DRAWINGS

FIG. 2 illustrates a typical disk array.
FIG. 3 illustrates disk-array-controller-managed error-detection-code ("EDC") bytes within a linear data space mapped by the disk-array controller to logical blocks provided at the disk interface by a disk device contained within the disk array.
FIG. 6 shows a control-flow diagram for the routine "check for error" called in step 509 of FIG. 5.

DETAILED DESCRIPTION OF THE INVENTION

Figure 1:
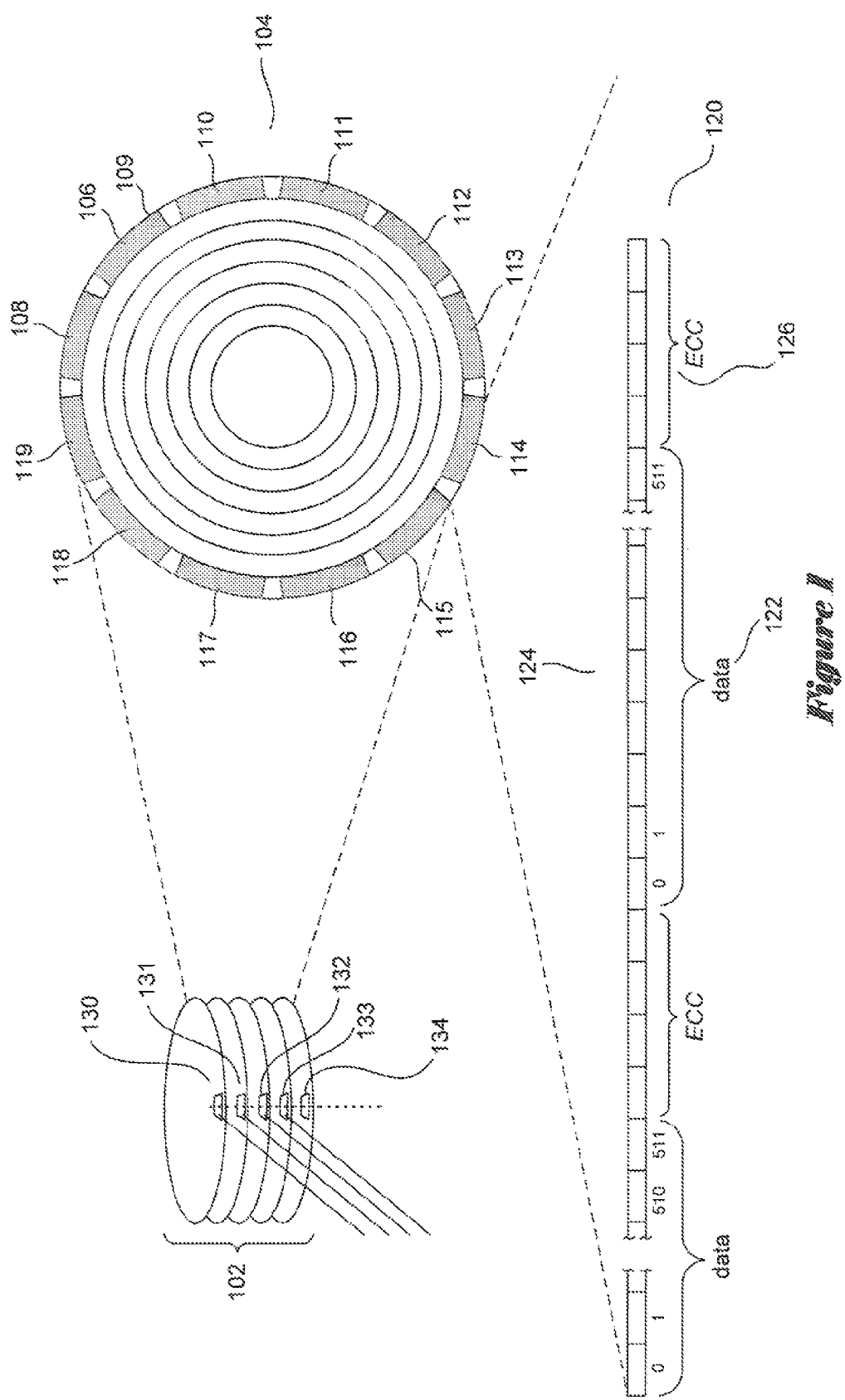
FIG. 1 illustrates a modern disk storage device.

The present invention is related to efficient and comprehensive block-level data-corruption detection and data-corruption correction in multi-device, redundancy-based data-storage systems, including RAID systems. In a first subsection, below, the mathematical basis for certain types of error detection and error correction is discussed. In a second, following subsection, embodiments of the present invention are discussed.

Error Detection and Error Correction Methods

Embodiments of the present invention employ concepts derived from well-known techniques in error-control encoding. An excellent reference for this field is the textbook "Error Control Coding: The Fundamentals and Applications," Lin and Costello, Prentice-Hall, Incorporated, New Jersey, 1983. In this subsection, a brief description of the error-detection and error-correction techniques used in error-control encoding is described. Additional details can be obtained from the above-referenced textbook, or from many other textbooks, papers, and journal articles in this field. The current subsection represents a rather mathematically precise, but concise, description of certain types of error-control encoding techniques. Error-control encoding techniques systematically introduce supplemental bits or symbols into plain-text messages, or encode plain-text messages using a greater number of bits or symbols than absolutely required, in order to provide information in encoded messages to allow for errors arising in storage or transmission to be detected and, in some cases, corrected. One effect of the supplemental or more-than-absolutely-needed bits or symbols is to increase the distance between valid codewords, when codewords are viewed as vectors in a vector space and the distance between codewords is a metric derived from the vector subtraction of the codewords.

In describing error detection and correction, it is useful to describe the data to be transmitted, stored, and retrieved as one or more messages, where a message $\mu$ comprises an ordered sequence of symbols, $\mu_i$, that are elements of a field F. A message $\mu$ can be expressed as:

$$\mu = (\mu_0, \mu_1, \ldots \mu_{k-1})$$

where $\mu_i \in F$.

The field F is a set that is closed under multiplication and addition, and that includes multiplicative and additive inverses. It is common, in computational error detection and correction, to employ fields comprising a subset of integers with sizes equal to a prime number, with the addition and multiplication operators defined as modulo addition and modulo multiplication. In practice, the binary field is commonly employed. Commonly, the original message is encoded into a message c that also comprises an ordered sequence of elements of the field F, expressed as follows:

$$c = (c_0, c_1, \ldots c_{n-1})$$

where $c_i \in F$.

Block encoding techniques encode data in blocks. In this discussion, a block can be viewed as a message μ comprising a fixed number of symbols k that is encoded into a message c comprising an ordered sequence of n symbols. The encoded message c generally contains a greater number of symbols than the original message μ, and therefore n is greater than k. The r extra symbols in the encoded message, where r equals n−k, are used to carry redundant check information to allow for errors that arise during transmission, storage, and retrieval to be detected with an extremely high probability of detection and, in many cases, corrected.

In a linear block code, the $2^k$ codewords form a k-dimensional subspace of the vector space of all n-tuples over the field F. The Hamming weight of a codeword is the number of non-zero elements in the codeword, and the Hamming distance between two codewords is the number of elements in which the two codewords differ. For example, consider the following two codewords a and b, assuming elements from the binary field:

a=(1 0 0 1 1)
b=(1 0 0 0 1)

The codeword a has a Hamming weight of 3, the codeword b has a Hamming weight of 2, and the Hamming distance between codewords a and b is 1, since codewords a and b differ only in the fourth element. Linear block codes are often designated by a three-element tuple [n, k, d], where n is the codeword length, k is the message length, or, equivalently, the base-2 logarithm of the number of codewords, and d is the minimum Hamming distance between different codewords, equal to the minimal-Hamming-weight, non-zero codeword in the code.

The encoding of data for transmission, storage, and retrieval, and subsequent decoding of the encoded data, can be notationally described as follows, when no errors arise during the transmission, storage, and retrieval of the data:

μ→c(s)→c(r)→μ where c(s) is the encoded message prior to transmission, and c(r) is the initially retrieved or received, message. Thus, an initial message μ is encoded to produce encoded message c(s) which is then transmitted, stored, or transmitted and stored, and is then subsequently retrieved or received as initially received message c(r). When not corrupted, the initially received message c(r) is then decoded to produce the original message μ. As indicated above, when no errors arise, the originally encoded message c(s) is equal to the initially received message c(r), and the initially received message c(r) is straightforwardly decoded, without error correction, to the original message μ.

When errors arise during the transmission, storage, or retrieval of an encoded message, message encoding and decoding can be expressed as follows:

μ(s)→c(s)→c(r)→μ(r)

Thus, as stated above, the final message μ(r) may or may not be equal to the initial message μ(s), depending on the fidelity of the error detection and error correction techniques employed to encode the original message μ(s) and decode or reconstruct the initially received message c(r) to produce the final received message μ(r). Error detection is the process of determining that:

c(r)≠c(s)

while error correction is a process that reconstructs the initial, encoded message from a corrupted initially received message:

c(r)→c(s)

The encoding process is a process by which messages, symbolized as μ, are transformed into encoded messages c. Alternatively, a message μ can be considered to be a word comprising an ordered set of symbols from the alphabet consisting of elements of F, and the encoded messages c can be considered to be a codeword also comprising an ordered set of symbols from the alphabet of elements of F. A word μ can be any ordered combination of k symbols selected from the elements of F, while a codeword c is defined as an ordered sequence of n symbols selected from elements of F via the encoding process:

{c:μ→c}

Linear block encoding techniques encode words of length k by considering the word μ to be a vector in a k-dimensional vector space, and multiplying the vector μ by a generator matrix, as follows:

c=μ·G

Notationally expanding the symbols in the above equation produces either of the following alternative expressions:

$$(c_0, c_1, \ldots, c_{n-1}) = (\mu_0, \mu_1, \ldots, \mu_{k-1}) \begin{pmatrix} g_{00} & g_{01} & g_{02} & \cdots & g_{0,n-1} \\ \vdots & & & \ddots & \vdots \\ g_{k-1,0} & g_{k-1,1} & g_{k-1,2} & \cdots & g_{k-1,n-1} \end{pmatrix}$$

$$(c_0, c_1, \ldots, c_{n-1}) = (\mu_0, \mu_1, \ldots, \mu_{k-1}) \begin{pmatrix} g_0 \\ g_1 \\ \vdots \\ g_{k-1} \end{pmatrix}$$

where $g_i=(g_{i,0}, g_{i,1}, g_{i,2} \cdots g_{i,n-1})$.

The generator matrix G for a linear block code can have the form:

$$G_{k,n} = \begin{pmatrix} p_{0,0} & p_{0,1} & \cdots & p_{0,r-1} & 1\,0\,0\ldots 0 \\ p_{1,0} & p_{1,1} & \cdots & p_{1,r-1} & 0\,1\,0\ldots 0 \\ & & \cdots & & 0\,0\,1\ldots 0 \\ \vdots & \vdots & \cdots & & \cdots \\ & & \cdots & & \cdots \\ p_{k-1,0} & p_{k-1,1} & \cdots & p_{k-1,r-1} & 0\,0\,0\ldots 1 \end{pmatrix}$$

or, alternatively:

$G_{k,n}=[P_{k,r}|I_{k,k}]$.

Thus, the generator matrix G can be placed into a form of a matrix P augmented with a k-by-k identity matrix $I_{k,k}$. A code generated by a generator in this form is referred to as a "systematic code." When this generator matrix is applied to a word μ, the resulting codeword c has the form:

c=($c_0, c_1, \ldots, c_{r-1}, \mu_0, \mu_1, \ldots, \mu_{k-1}$)

where $c_i = \mu_0 p_{0,i} + \mu_1 p_{1,i}, \ldots, \mu_{k-1}p_{k-1,i}$).

Note that, in this discussion, a convention is employed in which the check symbols precede the message symbols. An alternate convention, in which the check symbols follow the message symbols, may also be used, with the parity-check and identity submatrices within the generator matrix interposed to generate codewords conforming to the alternate convention. Thus, in a systematic linear block code, the codewords comprise r parity-check symbols $c_i$ followed by the symbols comprising the original word μ. When no errors arise, the original word, or message μ, occurs in clear-text form within, and is easily extracted from, the corresponding codeword. The parity-check symbols turn out to be linear combinations of the symbols of the original message, or word μ.

One form of a second, useful matrix is the parity-check matrix $H_{r,n}$, defined as:

$$H_{r,n}=[I_{r,r}|-P^T]$$

or, equivalently, $$H_{r,n} = \begin{pmatrix} 1\,0\,0\,\ldots\,0 & -p_{0,0} & -p_{1,0} & -p_{2,0} & \cdots & -p_{k-1,0} \\ 0\,1\,0\,\ldots\,0 & -p_{0,1} & -p_{1,1} & -p_{2,1} & \cdots & -p_{k-1,1} \\ 0\,0\,1\,\ldots\,0 & -p_{0,2} & -p_{1,2} & -p_{2,2} & \cdots & -p_{k-1,2} \\ \ldots & \ldots & \ldots & \ldots & & \\ 0\,0\,0\,\ldots\,1 & -p_{0,r-1} & -p_{1,r-1} & -p_{0,r-1} & \cdots & -p_{k-1,r-1} \end{pmatrix}.$$

The parity-check matrix can be used for systematic error detection and error correction. Error detection and correction involves computing a syndrome S from an initially received or retrieved message c(r) as follows:

$$S=(s_0,s_1,\ldots,s_{r-1})=c(r)\cdot H^T$$

where $H^T$ is the transpose of the parity-check matrix $H_{r,n}$ expressed as:

$$H^T = \begin{pmatrix} 1 & 0 & 0 & \cdots & 0 \\ 0 & 1 & 0 & \cdots & 0 \\ 0 & 0 & 1 & \cdots & 0 \\ \cdots & \cdots & \cdots & \cdots & 1 \\ -p_{0,0} & -p_{0,1} & -p_{0,2} & \cdots & -p_{0,r-1} \\ -p_{1,0} & -p_{0,1} & -p_{0,2} & \cdots & -p_{0,r-1} \\ -p_{2,0} & -p_{0,1} & -p_{0,2} & \cdots & -p_{0,r-1} \\ \cdots & \cdots & \cdots & \cdots & \cdots \\ -p_{k-1,0} & -p_{k-1,1} & -p_{k-1,2} & \cdots & -p_{k-1,r-1} \end{pmatrix}.$$

Note that, when a binary field is employed, x=−x, so the minus signs shown above in $H^T$ are generally not shown. The syndrome S can be used to compute an error-location polynomial that can be used to determine which of the message symbols are corrupted, and, in certain cases, to compute the uncorrupted values for the corrupted symbols.

Hamming codes are linear codes created for error-correction purposes. For any positive integer m greater than or equal to 3, there exists a Hamming code having a codeword length n, a message length k, number of parity-check symbols r, and minimum Hamming distance $d_{min}$ as follows:

$$n=2^m-1$$

$$k=2^m-m-1$$

$$r=n-k=m$$

$$d_{min}=3$$

The parity-check matrix H for a Hamming Code can be expressed as:

$$H=[I_m|Q]$$

where $I_m$ is an m×m identity matrix and the submatrix Q comprises all $2^m-m-1$ distinct columns which are m-tuples each having 2 or more non-zero elements. For example, for m=3, a parity-check matrix for a [7,4,3] linear block Hamming code is $$H = \begin{pmatrix} 1 & 0 & 0 & 0 & 1 & 1 & 1 \\ 0 & 1 & 0 & 1 & 1 & 1 & 0 \\ 0 & 0 & 1 & 1 & 0 & 1 & 1 \end{pmatrix}$$

A generator matrix for a Hamming code is given by:

$$G=[Q^T I_{2^m-m-1}]$$

where $Q^T$ is the transpose of the submartix Q, and $I_{2^m-m-1}$ is a $(2^m-m-1)\times(2^m-m-1)$ identity matrix. By systematically deleting l columns from the parity-check matrix H, a parity-check matrix H' for a shortened Hamming code can generally be obtained, with:

$$n=2^m-l-1$$

$$k=2^m-m-l-1$$

$$r=n-k=m$$

$$d_{min}\geq 3$$

Other types of codes are employed to increase the Hamming distance between codewords in various applications. Many of these alternative codes do not have the convenient properties of linear block codes, including easy generation using generator matrices, and the transparent, pass-through feature of linear block codes allowing for the encoded value to be directly read from the code word. For linear block codes, a plain-text message transfers directly to a codeword containing, in addition, parity-check symbols or bits. In other types of codes, the plain-text message is not directly readable in a corresponding codeword. In both cases, codewords contain a greater number of symbols or bits than absolutely needed to enumerate all valid messages to be encoded. In the case of linear block codes, the additional symbols or bits are parity-check symbols or bits that supplement the plain-text symbols or bits, while in the other types of codes, valid messages are distributed throughout a vector space of dimension equal to the codeword size.

Large mass-storage systems, such as RAID systems, not only provide large storage capacities, but also provide and manage redundant storage, so that if portions of stored data are lost, due to a disk-drive failure, failure of particular cylinders, tracks, sectors, or blocks on disk drives, failures of electronic components, or other failures, the lost data can be seamlessly and automatically recovered from redundant data stored and managed by the large scale mass-storage systems, without intervention by host computers or manual intervention by users. For important data storage applications, including database systems and enterprise-critical data, two or more large scale mass-storage systems are often used to store and maintain multiple, geographically dispersed instances of the data, providing a higher-level redundancy so that even catastrophic events do not lead to unrecoverable data loss.

One class of redundancy involves disk-level mirroring, or, in other words, storing multiple, discrete copies of data objects on two or more disks, so that failure of one disk does not lead to unrecoverable data loss. A second redundancy class is referred to as "erasure coding" redundancy. Erasure coding redundancy is somewhat more complicated than mirror redundancy. Erasure coding redundancy often employs Reed-Solomon encoding techniques used for error control coding of communications messages and other digital data transferred through noisy channels. These error-control-coding techniques are specific examples of linear block codes. Reed-Solomon codes are non-binary codes with symbols from the Galois field GF(q), where q is a power of a prime number, with block length n=q−1, n−k=2t parity-check digits, with a minimum distance between codewords of 2t+1, and where 2t corruption errors in a block are detectable, t corruption errors are correctable, and 2t erasures are correctable. In general, in data-redundancy applications, the errors of concern are erasures with known locations, or, in other words, known disk failures.

In certain types of erasure-coding-redundancy-based methods, a data object is stored as groups of blocks, referred to as "stripes," each block stored on a different disk of a group of n+m disks, referred to below as a "RAID group." A group of n data-containing blocks is distributed across n disks, and m parity blocks containing parity bytes computed from groups of data bytes with the n data blocks are distributed across m disks. Such erasure-coding redundancy schemes are referred to as n+m erasure coding redundancy scheme. Many erasure coding redundancy schemes are possible, including 8+2, 3+3, 3+1, and other schemes. In general, m is less than or equal to n. As long as m or less of the n+m disks fail, regardless of whether the failed disks contain data or parity values, the entire data object can be restored. RAID 6 systems employ 2 parity blocks to allow two failed disks in RAID group, such as 2 disks in a 10-disk RAID group representing an 8+2 erasure-coding redundancy scheme, to be recovered.

Erasure coding redundancy is generally carried out by mathematically computing checksum or parity bits for each byte, word, or long word of a data unit. Thus, m parity bits are computed from n data bits, where n=8, 16, or 32, or a higher power of two. For example, in an 8+2 erasure coding redundancy scheme, two parity check bits are generated for each byte of data. Thus, in an 8+2 erasure coding redundancy scheme, eight data units of data generate two data units of checksum, or parity bits, all of which can be included in a ten-data-unit stripe. In the following discussion, the term "word" refers to a data-unit granularity at which encoding occurs, and may vary from bits to longwords or data units of greater length. In data-storage applications, the data-unit granularity may typically be 512 bytes or greater.

The $i^{th}$ checksum word $c_i$ may be computed as a function of all n data words by a function $F_i(d_1, d_2, \ldots, d_n)$ which is a linear combination of each of the data words $d_j$ multiplied by a coefficient $f_{i,j}$, as follows:

$$c_i = F_i(d_1, d_2, \ldots, d_n) = \sum_{j=1}^{n} d_j f_{i,j}$$

In matrix notation, the equation becomes:

$$\begin{bmatrix} c_1 \\ c_2 \\ \vdots \\ c_m \end{bmatrix} = \begin{bmatrix} f_{1,1} & f_{1,2} & \cdots & f_{1,n} \\ f_{2,1} & f_{2,2} & \cdots & f_{2,n} \\ \vdots & \vdots & & \vdots \\ f_{m,1} & f_{m,2} & \cdots & f_{m,n} \end{bmatrix} \begin{bmatrix} d_1 \\ d_2 \\ \vdots \\ d_n \end{bmatrix}$$

or:

$$C = FD$$

In the Reed-Solomon technique, the function F is chose to be an m×n Vandermonde matrix with elements $f_{i,j}$ equal to $j^{i-1}$, or:

$$F = \begin{bmatrix} 1 & 1 & \cdots & 1 \\ 1 & 2 & \cdots & n \\ \vdots & \vdots & & \vdots \\ 1 & 2^{m-1} & \cdots & n^{m-1} \end{bmatrix}$$

If a particular word $d_j$ is modified to have a new value $d'_j$, then a new $i^{th}$ check sum word $c'_i$ can be computed as:

$$c'_i = c_i + f_{i,j}(d'_j - d_j)$$

or:

$$c' = C + FD' - FD = C + F(D' - D)$$

Thus, new checksum words are easily computed from the previous checksum words and a single column of the matrix F.

Lost words from a stripe are recovered by matrix inversion. A matrix A and a column vector E are constructed, as follows:

$$A = \begin{bmatrix} I \\ F \end{bmatrix} = \begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{n-1} \end{bmatrix}$$

$$E = \begin{bmatrix} D \\ C \end{bmatrix} = \begin{bmatrix} d_1 \\ d_2 \\ \vdots \\ d_n \\ c_1 \\ c_2 \\ \vdots \\ c^m \end{bmatrix}$$

It is readily seen that:

$$AD = E$$

or:

$$\begin{bmatrix} 1 & 0 & 0 & \cdots & 0 \\ 0 & 1 & 0 & \cdots & 0 \\ 0 & 0 & 1 & \cdots & 0 \\ \vdots & \vdots & \vdots & & \vdots \\ 0 & 0 & 0 & \cdots & 1 \\ 1 & 1 & 1 & \cdots & n \\ 1 & 2 & 3 & \cdots & n \\ \vdots & \vdots & \vdots & & \vdots \\ 1 & 2^{m-1} & 3^{m-1} & \cdots & n^{n-1} \end{bmatrix} \begin{bmatrix} d_1 \\ d_2 \\ \vdots \\ d_n \end{bmatrix} = \begin{bmatrix} d_1 \\ d_2 \\ d_3 \\ \vdots \\ d_n \\ c_1 \\ c_2 \\ \vdots \\ c^m \end{bmatrix}$$

One can remove any m rows of the matrix A and corresponding rows of the vector E in order to produce modified matrices A' and E', where A' is a square matrix. Then, the vector D representing the original data words can be recovered by matrix inversion as follows:

$$A'D=E'$$

$$D=A'^{-1}E'$$

Thus, when m or fewer data or checksum words are erased, or lost, m data or checksum words including the m or fewer lost data or checksum words can be removed from the vector E, and corresponding rows removed from the matrix A, and the original data or checksum words can be recovered by matrix inversion, as shown above.

While matrix inversion is readily carried out for real numbers using familiar real-number arithmetic operations of addition, subtraction, multiplication, and division, discrete-valued matrix and column elements used for digital error control encoding are suitable for matrix multiplication only when the discrete values form an arithmetic field that is closed under the corresponding discrete arithmetic operations. In general, checksum bits are computed for words of length w:

$$\underset{1\ 2\ 3\ \cdots\ w}{\square\square\square\square\square\square\square\square\cdots\square}$$

A w-bit word can have any of $2^w$ different values. A mathematical field known as a Galois field can be constructed to have $2^w$ elements. The arithmetic operations for elements of the Galois field are, conveniently:

$$a \pm b = a \oplus b$$

$$a*b = \text{antilog}\,[\log(a)+\log(b)]$$

$$a \div b = \text{antilog}\,[\log(a)-\log(b)]$$

where tables of logs and antilogs for the Galois field elements can be computed using a propagation method involving a primitive polynomial of degree w.

Mirror-redundancy schemes are conceptually more simple, and easily lend themselves to various reconfiguration operations. For example, if one disk of a 3-disk, triple-mirror-redundancy scheme fails, the remaining two disks can be reconfigured as a 2-disk mirror pair under a double-mirroring-redundancy scheme. Alternatively, a new disk can be selected for replacing the failed disk, and data copied from one of the surviving disks to the new disk to restore the 3-disk, triple-mirror-redundancy scheme. By contrast, reconfiguration of erasure coding redundancy schemes is not as straightforward. For example, each checksum word within a stripe depends on all data words of the stripe. If it is desired to transform a 4+2 erasure-coding-redundancy scheme to an 8+2 erasure-coding-redundancy scheme, then all of the checksum bits may be recomputed, and the data may be redistributed over the 10 disks used for the new, 8+2 scheme, rather than copying the relevant contents of the 6 disks of the 4+2 scheme to new locations. Moreover, even a change of stripe size for the same erasure coding scheme may involve recomputing all of the checksum data units and redistributing the data across new disk locations. In most cases, change to an erasure-coding scheme involves a complete construction of a new configuration based on data retrieved from the old configuration rather than, in the case of mirroring-redundancy schemes, deleting one of multiple disks or adding a disk, with copying of data from an original disk to the new disk. Mirroring is generally less efficient in space than erasure coding, but is more efficient in time and expenditure of processing cycles.

Embodiments of the Present Invention

FIG. 1 illustrates a modern disk storage device. A modern disk storage device generally includes a stack of parallel magnetic-disk platters 102, each platter accessed by a separate, electromechanical READ/WRITE head. Each magnetic-disk platter, such as magnetic-disk platter 104, stores binary data in concentric tracks, such as track 106 at the outer edge of the magnetic-disk platter 104. Each track is, in turn, divided into sectors, each sector a radial segment of a track with a fixed size, in stored bytes, and separated from adjacent sectors by a gap. In FIG. 1, the outer-most track 106 of magnetic-disk platter 104 is shown divided into 12 sectors 108-119, each sector shown shaded in FIG. 1. Each sector is further organized as a contiguous set of one or more blocks. In FIG. 1, sector 114 is shown as containing a linear sequence of bytes that together comprise two blocks 120. Each block contains an ordered sequence of data bytes, such as the 512 data bytes 122 of the second block 124 in the sector, followed by a small set of contiguous error-control-and-correction bytes ("ECC bytes") 126. In the example of FIG. 1, and in subsequent examples, disk blocks with 512 data bytes are shown, but disk blocks may have a variety of fixed sizes, including 1024 and 4096 data bytes, and, in certain modern disk drives, may be configurable. Because the mechanical READ/WRITE heads are aligned within a disk device, a number of tracks equal to the number of magnetic-disk platters can be simultaneously accessed by the disk device. For example, as shown in FIG. 1, five tracks 130-134 can be simultaneously accessed by five READ/WRITE heads associated with the five magnetic-disk platters 102. The 5 tracks are referred to as a "cylinder."

The disk controller of a disk device manages physical-block to logical-block addressing within the disk device, in order to present a linear, logical-block-address space to host computers, RAID controllers, and other remote entities that interface to the disk controller. In the following discussion, this interface is referred to as the "logical-block disk interface." In general, the disk controller internally manages the ECC bytes and associated error detection and error correction within the disk device. The disk controller detects corrupted data blocks, corrects those corruptions correctable through the ECC code employed, and automatically re-maps faulty blocks to spare blocks. The ECC bytes and block remappings are generally transparent to remote devices, and are not included in reported block sizes. A 512-byte block includes 512 data blocks and some additional number of bytes. A remote device, such as a host computer or RAID controller, accesses a logical sequence of 512-byte disk blocks, unaware of the additional ECC bytes and bad-block remapping. In certain modern disk devices, the disk controller may expose all or a portion of the ECC bytes and other such details to higher-level devices. Other disk devices, particularly less expensive disk devices, do not reveal these details to higher-level, accessing entities. Various types of ECC may be employed, from simple parity bytes, longitudinal redundancy check, cyclic redundancy checks, and other such schemes. In current disk devices, Reed-Solomon codes with an additional CRC are often employed as the ECC.

Disk arrays include a large number of individual disk devices. Disk arrays provide a virtual, logical-device interface to accessing host computers, with arbitrarily-sized logical devices that provide logical-block interfaces. FIG. 2 illustrates a typical disk array. The disk array 202 includes a large number of individual disk devices, such as disk 204, interconnected through a mid-plane 206 to multiple disk-array-controller boards 208 and 210, each including microprocessors and memory for executing disk-array controller programs. Disk arrays generally also include redundant power supplies, redundant cooling systems, redundant communications ports, and other such components. A disk array therefore provides a higher-level abstraction of an array of multiple disks to host computers and other accessing entities.

Many modern disk-array controllers employ relatively inexpensive disks. Although these disks include ECC bytes, as discussed above with reference to FIG. 1, they may have a lower level of reliability than needed for many fault-tolerant disk-array applications. For this reason, disk-array controllers often insert an additional set of error-detection-code ("EDC") bytes for each block of data stored on the disks. FIG. 3 illustrates disk-array-controller-managed error-detection-code ("EDC") bytes within a linear data space mapped by the disk-array controller to logical blocks provided at the disk interface by a disk device contained within the disk array. As shown in FIG. 3, the disk-array controller creates a virtual, linear address space 302 from the liner, logical-disk-block address space provided by a disk at the logical-block disk interface. As shown in FIG. 3, the disk-array controller adds additional EDC bytes, such as additional EDC bytes 304, to each logical block, such as logical block 306, to produce, in the current example, a 520-byte virtual block comprising 512 data bytes and eight disk-array-controller managed EDC bytes. The disk-array controller maps these 520-byte blocks to 512-byte logical blocks provided by the disk devices. Thus, a host computer accesses 512-byte data blocks through the virtual logical-device interface that are internally mapped to 520-byte virtual blocks by the disk-array controller. The disk-array controller then maps the 520-byte virtual blocks to 512-byte logical blocks provided by the disk at the logical-block disk interface. As discussed with reference to FIG. 1, the disk, in turn, maps the 512-byte logical blocks to larger physical blocks that include disk-array-controller-managed ECC bytes. Thus, disk controllers independently create and manage ECC bytes on a per-block basis and disk-array controllers separately create and manage additional EDC bytes for 512-data-byte blocks provided through the virtual logical-device interface to host computers and other accessing entities.

Alternatively, when the disk devices used in a disk array support variable-block-length formatting, the disk-array controller may format the disk devices to provide 520-byte blocks, and then map 512-byte blocks provided by the disk-array controller to host computers through the virtual logical-device interface to 520-byte disk blocks, adding 8 EDC bytes to each 512-byte virtual-logical-device block.

As discussed above, in a previous subsection, RAID controllers use Reed-Solomon error-correction-code-based techniques for redundantly storing data in a RAID system. RAID controllers are often disk-array controllers implemented to incorporate erasure-coding data redundancy according to any of various RAID schemes. A RAID 5 system can suffer failure of one disk in a group of disks across which data is striped, and recover the data of the failed disk from data stored on the remaining disks of the stripe. A RAID 6 system can tolerate failure of two disks within each group of disks across which data is striped.

Figure 4A:
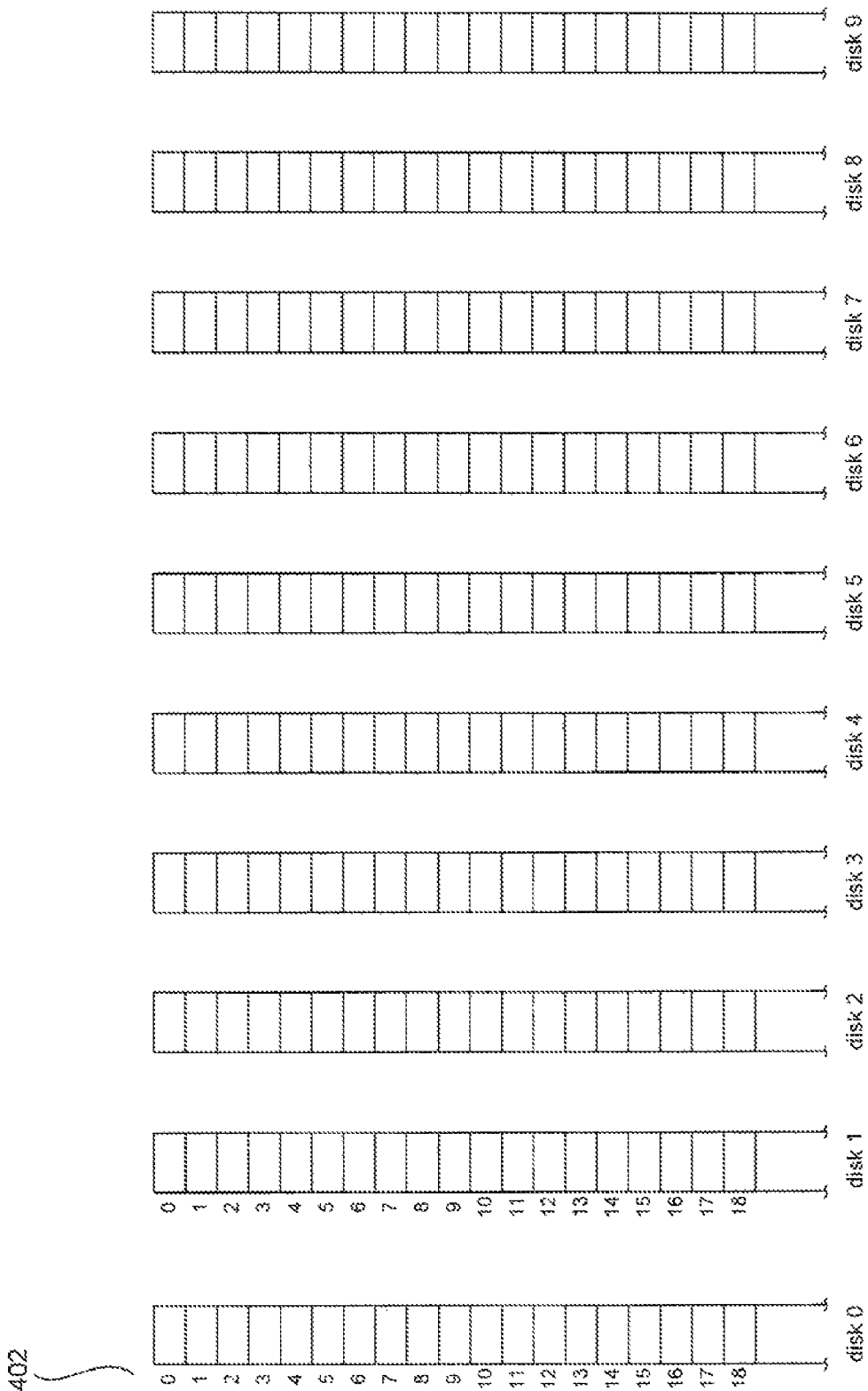
FIGS. 4A-D illustrate an example of RAID 6 redundant data storage within a RAID system.
Figure 4B:
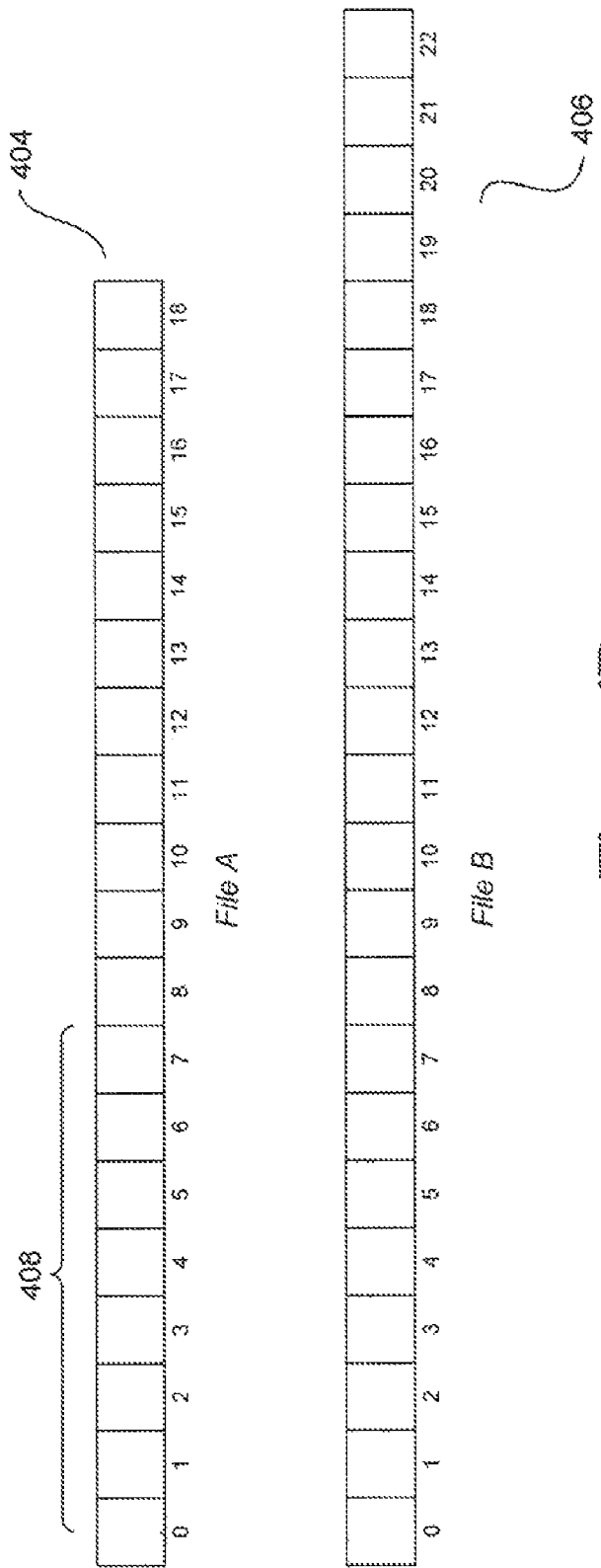
Figure 4C:
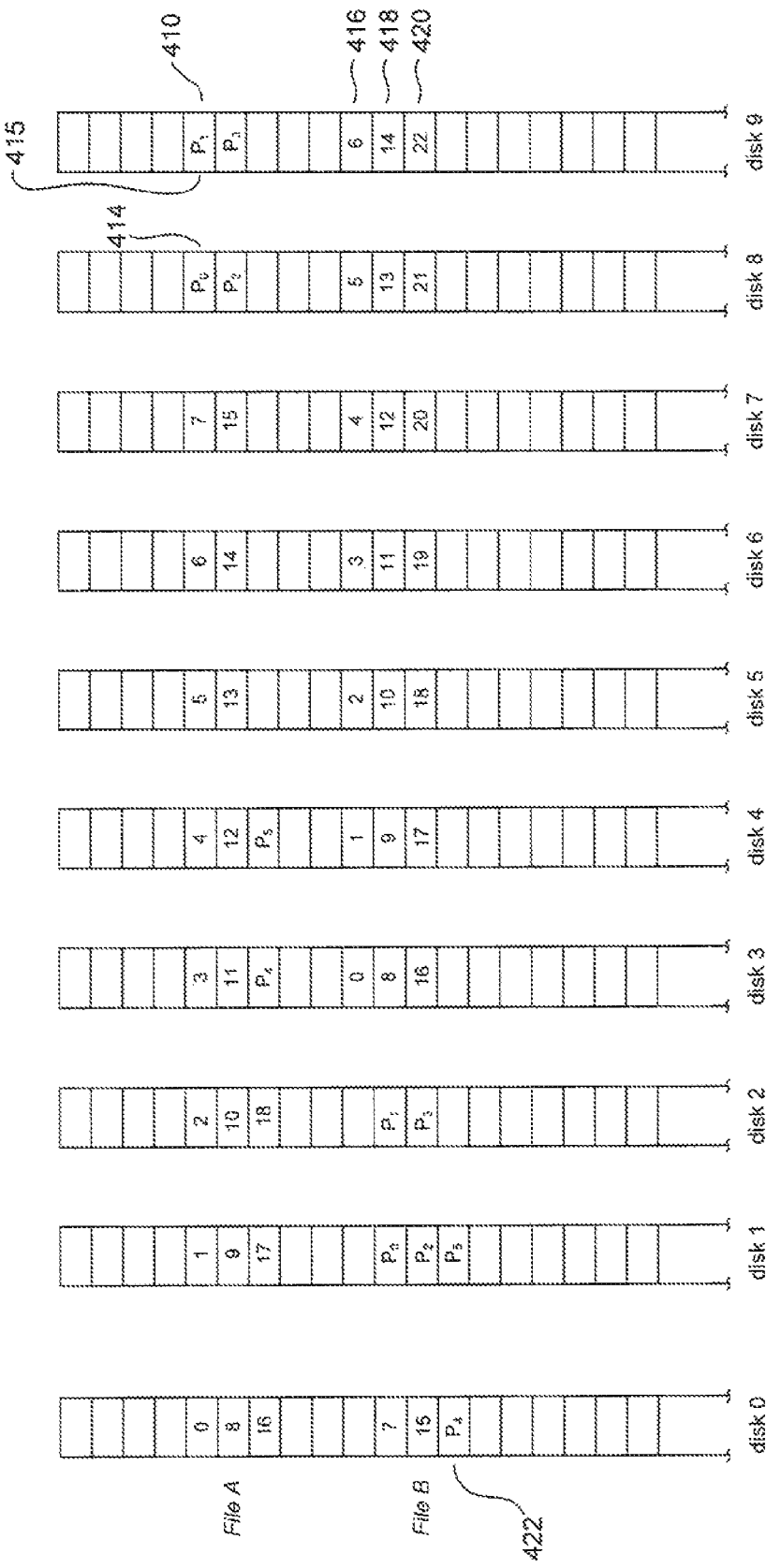
Figure 4D:
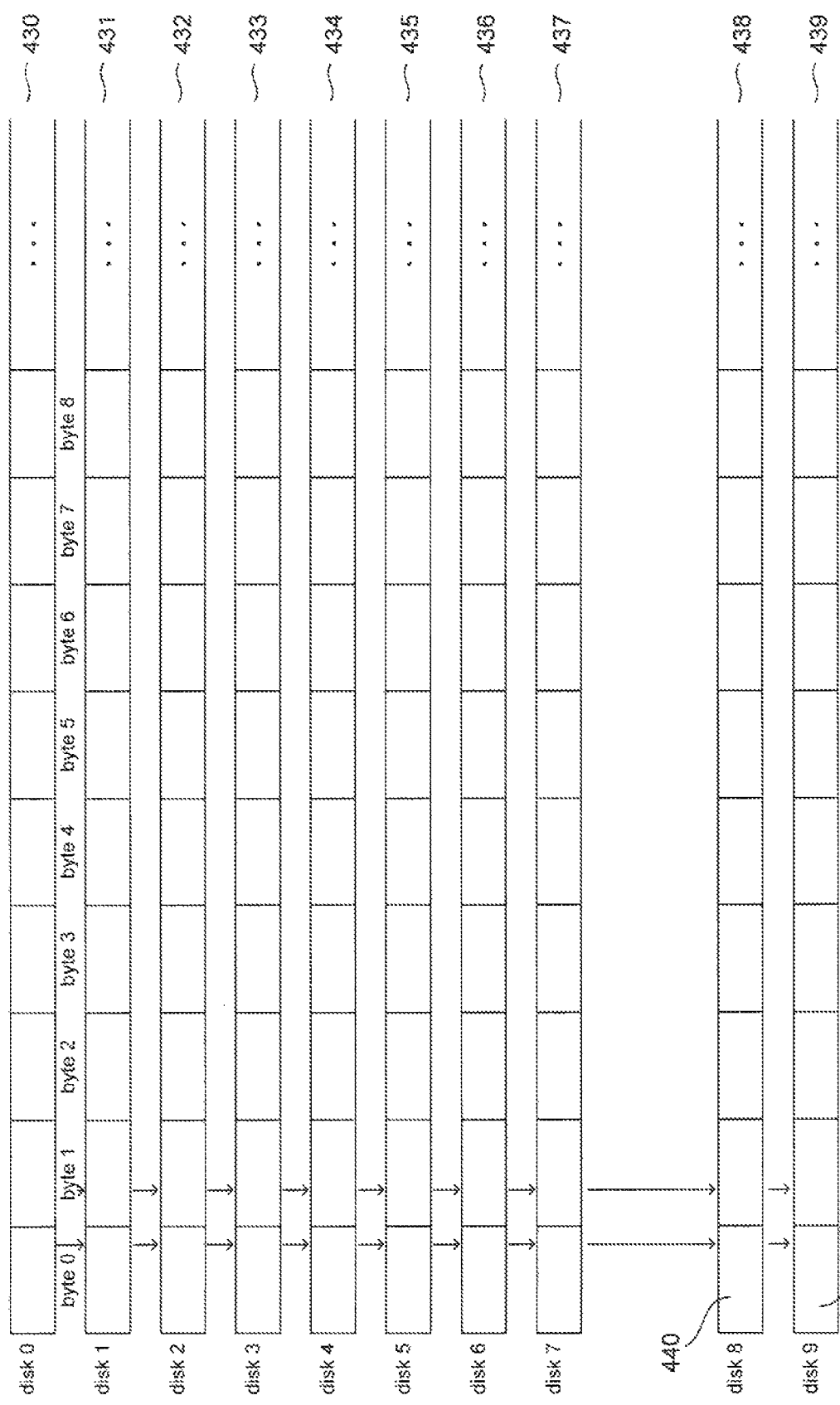

FIGS. 4A-D illustrate an example of RAID 6 redundant data storage within a RAID system. In FIG. 4A, the contents of 10 disks that together comprise a RAID group within a RAID system are illustrated. Each disk can be considered to be a linear sequence of blocks. In FIG. 4A, the linear sequence of blocks 402 within disk 0 are shown sequentially numbered. FIG. 4B illustrates the linear sequence of blocks that comprise two different files. As shown in FIG. 4B, file A comprises a sequence of 19 blocks 404, and file B comprises a sequence of 23 blocks 406. FIG. 4C illustrates striping of the blocks of file A and file B across the 10 disks in the RAID group illustrated in FIG. 4A. The first eight blocks of file A 408 reside, as indicated in FIG. 4C, in a first stripe 410 on disk 0 through disk 7, respectively. Two parity blocks $P_0$ and $P_1$ 414 and 415 that contain parity bytes computed, as discussed in the previous subsection, for the eight data blocks, reside on disk 9 and disk 10. The eight data blocks and two parity blocks together comprise the single stripe 410 across the 10 disks of the RAID group. As shown in FIG. 4C, file A is distributed across the 10 disks of the RAID group in two full stripes and a portion of a third stripe. File B is distributed across the 10 disks of the RAID group in a first partial stripe 416, two full stripes 418 and 420, and a final partial stripe 422. As discussed in a previous subsection, should any two of the 10 disks in the RAID group fail, mathematical techniques can be used to reconstruct each file object stored in the RAID group by matrix inversion. FIG. 4D illustrates construction of the parity blocks. In FIG. 4D, the data blocks 430-437 and parity blocks 438-439 of an 8+2 stripe, located on disks 0-9, are shown horizontally as sequences of bytes. As discussed in a previous subsection, each set of eight data bytes in an 8+2 redundancy scheme generates two parity bytes. Thus, bytes 0 from each of the blocks 430-437 generate the first parity byte 440 of the first parity block 438 and the first parity byte 442 of the second parity block 439. Subsequent groups of eight data bytes, one from each data block 430-437, generate subsequent parity bytes in each of the parity blocks 438 and 439.

To recapitulate, the disk controllers of each disk within a disk array manage ECC bytes for each 512-byte data block, as discussed with reference to FIG. 1. Disk controllers can detect and correct a certain class of errors, depending on the number of ECC bytes created and managed for each 512-byte disk block, and depending of the error-detection-and-correction scheme employed. At a second level, a disk-array controller creates and manages a number of EDC bytes for each 512-byte logical data block. In other words, the disk-array controller maps 520-byte virtual blocks to 512-byte logical blocks. The disk-array-controller created and managed EDC bytes are simply data, at the disk-controller level. Finally, at a higher level, a RAID controller within a RAID system creates and manages multiple parity blocks for each group of data blocks within a RAID stripe. At this level, the parity blocks are meant to introduce data redundancy, to allow the RAID controller to reconstruct data for one or more failed disks within each RAID group. All three layers of error-detection, error-correction, and erasure-coding schemes overlap one another.

Embodiments of the present invention recognize that the many-tiered error detection and error correction schemes within a RAID system may be redundant. Therefore, in raid systems implemented according to the present invention, the middle level of error detection and error correction, described above with reference to FIG. 3, is omitted. Rather than creating and managing additional EDC bytes, the RAID controller, according to the present invention, employs the RAID-controller created and managed parity bytes both for recovery of failed disks as well as for constant surveillance of data stored within the disks for block-level data corruption.

Figure 5:
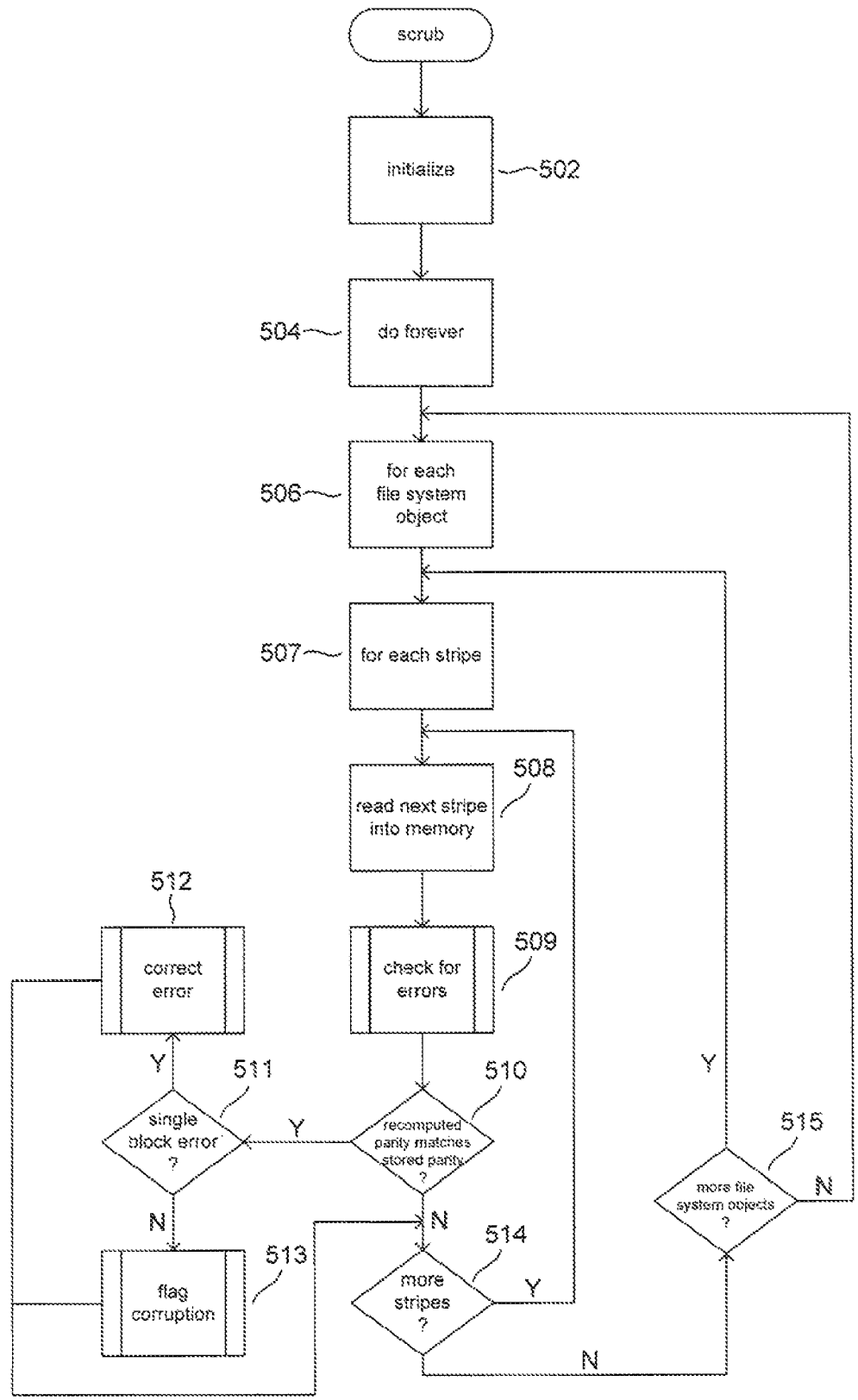
FIGS. 5-6 provide control-flow diagrams that describe one embodiment of the present invention.
Figure 6:
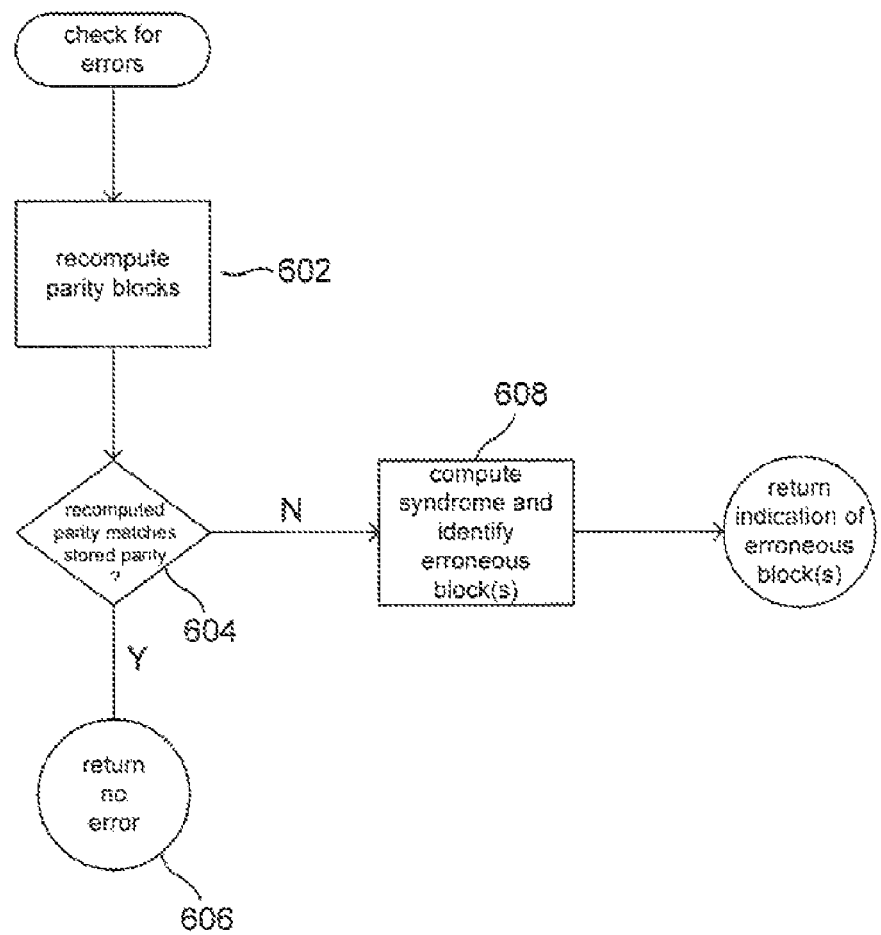

FIGS. 5-6 are control-flow diagrams that describe one embodiment of the present invention. FIG. 5 is a control-flow diagram for the routine "scrub." The routine "scrub" continuously executes within a RAID controller in order to monitor stored data for block-level data corruption. The routine "scrub" can be designed to execute using spare disk-array-controller processing cycles, in order to preserve full processor bandwidth for data-storage and data-retrieval commands. In a first step 502, the routine "scrub" is initialized. Initialization may vary significantly from RAID system to RAID system. The routine "scrub" accesses stored storage-system information in order to determine the configuration of the RAID system, the identities and sizes of various RAID groups, and the identities and sizes of the data objects stored in each RAID group. The routine "scrub" tracks changes to the RAID-system configuration during execution. Then, in a continuously executing do-loop comprising steps 502-515, the routine "scrub" examines each stored data object to determine whether any blocks are corrupted. In the second-level, nested for-loop of steps 506-514, the routine "scrub" analyzes each stored data object in a current do-loop iteration. In the next-lower-level for-loop of steps 507-513, the routine "scrub" analyzes each stripe of a currently analyzed stored data object. In step 508, the routine "scrub" reads the next stripe of the currently considered stored data object into memory. Then, in step 509, the routine "scrub" calls a routine, described below with reference to FIG. 6, to check the stripe for errors. If, as determined in step 510, errors are detected, then, in step 511, the routine "scrub" determines whether a single, recoverable error has been detected. If a single, recoverable error has been detected, then the error is corrected in step 512. Error recovery involves regenerating the data for a corrupted block from the remaining blocks of the stripe in memory, and then rewriting the data to the logical-block address of the corrupted block. The corrected block may be, transparently to the disk-array controller, rewritten to a spare block remapped by the disk device to the logical-block address of the corrupted block. Alternatively, the disk-array controller may handle bad-block remapping, and remap the corrupted block to a spare block. If, on the other hand, the detected error is not correctable, then the detected data corrupted is flagged, in step 513. A RAID controller can, in higher-level routines, endeavor to either correct defective stripes by obtaining higher-level redundant data from other sources, or may alternatively inform a host computer or other higher-level entity of the corruption. After the currently considered stripe is determined to be error free, or has been corrected or flagged in steps 512 and 513, then, in step 514, control returns to step 508 when there are further stripes within the currently considered stored data object. Otherwise, in step 515, control returns to step 507 when there are additional stored data objects to be analyzed. Finally, when all stored data objects have been analyzed in the current iteration, control returns to step 506 to embark on a next iteration of data-corruption surveillance.

FIG. 6 shows a control-flow diagram for the routine "check for errors" called in step 509 of FIG. 5. In step 602, the routine "check for errors" recomputes the parity blocks for a stripe. If, as determined in step 604, the recomputed parity blocks match the stored parity blocks, then an indication of no detected error is returned in step 606. Otherwise, in step 608, the routine "check for errors" computes a syndrome for the stripe, as discussed above, and identifies the erroneous block or blocks by computing an error-location polynomial from the syndrome. When a single block has been corrupted, then the corruption can be repaired from redundant data in the stripe, in step 512 of FIG. 5. Otherwise, the stripe is irretrievably corrupted, in which case corruption is flagged, in step 512 of FIG. 5.

Although the present invention has been described in terms of particular embodiments, it is not intended that the invention be limited to these embodiments. Modifications within the spirit of the invention will be apparent to those skilled in the art. For example, embodiments of the present invention can be incorporated into a wide variety of different RAID controllers using various different types of redundancy techniques, block sizes, and disk drives. For example, in a RAID system that uses triple mirroring, all three mirror triples of each block may be compared to determine whether or not all three match. If two match, and one is dissimilar, then the RAID system can infer that the odd, dissimilar block represents a data corruption, and can correct the data corruption by rewriting the block with the contents of one of the two matching blocks. Rather than computing and using a syndrome to locate a data error, an alternative scrub routine can successively recompute the stripe contents from each possible group of blocks in which one block is omitted. When a single block is corrupted, the parity check will succeed only when the corrupted block is omitted. A detected, single-bad-block within the stripe can be corrected by recomputing the data for the block from the data in the remaining blocks of the stripe, stored in memory. In general, in any system in which double redundancy is incorporated at the RAID-controller level for rebuilding failed disks, the same redundancy can be employed to locate and reconstruct a corrupted block within individual stripes. The present invention is applicable to data-storage systems based on storage devices other than magnetic disks. RAID controllers that incorporate methods of the present invention can be programmed in any number of different programming languages, with different modular organization, data structures, control structures, variables, and differences in other familiar programming parameters and characteristics. The RAID controller may be implemented in firmware, hardware, software, or a combination of two or more of firmware, hardware, and software. The data-corruption surveillance technique of the present invention can be applied continuously, or at longer intervals, and may be selectively applied in order to provide higher levels of robustness and fault tolerance to selection portions of the stored data.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A data-storage system comprising: a number of data-storage devices; and at least one data-storage-system controller that maps logical-block device interfaces provided by the data-storage devices to a virtual logical-device interface, employs a data-redundancy scheme to store sufficient redundant data within each stripe of each stored data object within the data-storage system, as two or more parity blocks, to recover data contained in at least two failed data-storage devices of a data-redundancy disk group, and uses the data-redundancy scheme to monitor stored data objects for block-level data corruption by, for each stripe, reading the stripe into memory, recomputing the parity blocks of the stripe, comparing the recomputed parity blocks to the parity blocks of the stripe, and when the recomputed parity blocks do not match the parity blocks of the stripe, handling a parity-block-match error.

2. The data-storage system of claim 1 wherein the number of data-storage devices is a number of magnetic disks that each provides a logical-block disk interface to accessing entities.

3. The data-storage system of claim 1 wherein the redundancy scheme is an erasure-coding-redundancy-based RAID scheme in which at least two parity blocks are generated and stored for each of a fixed-size group of data blocks that, together with the at least two parity blocks, comprise a stripe.

4. The data-storage system of claim 1 wherein the at least one data-storage-system controller handles a parity-block-match error by:
 when the parity-block-match error indicates that a single block of the stripe is corrupted,
  locating the single corrupted block,
  regenerating data for the corrupted block from remaining blocks of the stripe, and
  rewriting the regenerated data back to a replacement block; and
 when the parity-block-match error indicates that multiple blocks of the stripe are corrupted, flagging the stripe as corrupted.

5. The data-storage system of claim 4 wherein locating the single corrupted block further comprises computing a syndrome for the stripe and computing an error-locating polynomial from the syndrome.

6. The data-storage system of claim 4 wherein regenerating data for the corrupted block from remaining blocks of the stripe further includes computing the data for the corrupted block by matrix inversion from the remaining blocks in the stripe.

7. The data-storage system of claim 4 wherein locating the single corrupted block further comprises:
 considering each block in the stripe in turn,
  recomputing the stripe from all but the currently considered block of the stripe; and
  when a parity check of the recomputed stripe succeeds, determining that the currently considered block is corrupted.

8. A method for monitoring stored data objects for block-level data corruption in a data-storage system that employs a data-redundancy scheme to store sufficient redundant data within each stripe of each stored data object within the data-storage system, as two or more parity blocks, to recover data contained in at least two failed data-storage devices of a data-redundancy disk group, the method comprising:
 iteratively,
  for each stripe of each stored data object,
   reading the stripe into memory,
   recomputing parity blocks of the stripe in memory,
   comparing the recomputed parity blocks to the parity blocks of the stripe, and
   when the recomputed parity blocks do not match the parity blocks of the stripe,
    handling a parity-block-match error.

9. The method of claim 8 wherein the at least one data-storage-system controller handles a parity-block-match error by:
 when the parity-block-match error indicates that a single block of the stripe is corrupted,
  locating the single corrupted block,
  regenerating data for the corrupted block from remaining blocks of the stripe, and
  rewriting the regenerated data back to a replacement block; and
 when the parity-block-match error indicates that multiple blocks of the stripe are corrupted, flagging the stripe as corrupted.

10. The method of claim 9 wherein locating the single corrupted block further comprises computing a syndrome for the stripe and computing an error-locating polynomial from the syndrome.

11. The method of claim 9 wherein regenerating data for the corrupted block from remaining blocks of the stripe further includes computing the data for the corrupted block by matrix inversion from the remaining blocks in the stripe.

12. The method of claim 9 wherein locating the single corrupted block further comprises:
 considering each block in the stripe in turn,
  recomputing the stripe from all but the currently considered block of the stripe; and
  when a parity check of the recomputed stripe succeeds, determining that the currently considered block is corrupted.

13. Processor instructions stored in a computer readable memory that implement the method of claim 8.

14. Firmware instructions stored in a computer readable memory that implement the method of claim 8.

* * * * *